United States Patent
Nakano

(10) Patent No.: US 6,371,576 B2
(45) Date of Patent: Apr. 16, 2002

(54) METHOD OF CONTROLLING A VEHICLE HYDRAULIC BRAKE SYSTEM

(75) Inventor: Keita Nakano, Itami (JP)

(73) Assignee: Sumitomo (SEI) Brake Systems, Inc., Hisai (JP)

( * ) Notice: Subject to any disclaimer, the term of this patent is extended or adjusted under 35 U.S.C. 154(b) by 0 days.

(21) Appl. No.: 09/817,051

(22) Filed: Mar. 27, 2001

(30) Foreign Application Priority Data

Apr. 19, 2000 (JP) ........................................ 2000-118185

(51) Int. Cl.⁷ ................................................ B60T 8/66
(52) U.S. Cl. ................. 303/158; 303/113.3; 303/115.3; 303/116.2
(58) Field of Search ................................. 303/166, 155, 303/157, 158, 159, 113.3, 113.4, 114.1, 115.3, 116.1, 116.2, 119.1, DIG. 1–DIG. 3

(56) References Cited

U.S. PATENT DOCUMENTS

| 5,368,374 A | 11/1994 | Fujimoto |
| 5,545,929 A | 8/1996 | Fijioka et al. ............... 303/166 |
| 6,220,675 B1 | 4/2001 | Steffes |

FOREIGN PATENT DOCUMENTS

| DE | 19638920 | 3/1998 |
| DE | 19753786 | 6/1999 |
| DE | 19828553 | 6/2000 |
| DE | 19962649 | 7/2000 |
| EP | 0734929 | 10/1996 |
| JP | 2590825 | 1/1988 |
| JP | 01-213296 | 8/2001 |

OTHER PUBLICATIONS

English Language abstract of JP–2001–213296.

*Primary Examiner*—Douglas C. Butler
*Assistant Examiner*—Pamela J. Rodriguez
(74) *Attorney, Agent, or Firm*—Greenblum & Bernstein, P.L.C.

(57) ABSTRACT

A control method of a hydraulic pressure source-driving type vehicle hydraulic brake system is provided in which water hammering or worsening of the brake feeling does not occur when brake liquid is replenished through a replenish passage. A motor for driving a pump is actuated at a full driving force with an on-off valve in the brake liquid replenish passage opened in the stage in which the hydraulic pressure difference between the master cylinder pressure and the brake hydraulic pressure is small. Also, in the stage in which the brake hydraulic pressure is increased, so that the hydraulic pressure difference from the master cylinder hydraulic pressure has entered a predetermined range, a solenoid valve in the replenish passage is closed to return to the normal control in which the driving force of the motor is controlled so as to correspond to the hydraulic pressure difference.

2 Claims, 3 Drawing Sheets

METHOD OF CONTROLLING A VEHICLE HYDRAULIC BRAKE SYSTEM

BACKGROUND OF THE INVENTION

This invention relates to a method of controlling a vehicle hydraulic brake system provided with a hydraulic pressure source for producing brake hydraulic pressure.

In recent years, in order to achieve sophisticated vehicle behavior control and a light feeling of brake operation, as described e.g. in Japanese patent publication 2590825, a vehicle hydraulic brake system is employed in which a hydraulic pressure source for producing brake hydraulic pressure is provided and a driving device for the hydraulic pressure source is actuated based on a detection signal from a brake operating force detecting means for detecting the operating force applied to a brake operating member.

E.g. in a hydraulic pressure source-driven type brake system described in Japanese patent application 11-332660 by the present applicant, a brake fluid replenish passage communicating a master cylinder and wheel cylinders with each other, and an on-off valve and a check valve for preventing reverse flow from the wheel cylinder side toward the master cylinder are mounted in the replenish passage to replenish brake fluid from the master cylinder toward the wheel cylinders if the amount of brake fluid from the hydraulic pressure source is insufficient.

In a brake system provided with such a brake fluid replenish passage, the brake hydraulic pressure in the wheel cylinders and the hydraulic pressure in the master cylinder are detected, and the on-off valve in the replenish passage is opened when the pressure difference between the master cylinder hydraulic pressure and the brake hydraulic pressure exceeds a predetermined value, to replenish brake fluid from the master cylinder side to the wheel cylinders. This replenish passage is opened in the initial period of brake operation, in which due to the fact that the consumed fluid amount in the wheel cylinders is large, a hydraulic pressure difference between the master cylinder hydraulic pressure and the brake hydraulic pressure tends to occur.

If brake hydraulic pressure is produced only by the hydraulic pressure source by closing the replenish passage, using the pressure difference between the master cylinder hydraulic pressure and the brake hydraulic pressure as an input signal for control, the driving force by the driving device for the hydraulic pressure source is PID-controlled.

In such a hydraulic pressure source-driven type brake system, the master cylinder for producing hydraulic pressure according to the operating force applied to the brake operating member is in communication with wheel cylinders through the on-off valve by way of the so-called master cylinder passage. If the hydraulic pressure source is not operating normally, the hydraulic pressure in the master cylinder is transmitted as brake hydraulic pressure by opening the on-off valve to provide a failsafe function.

In the hydraulic pressure source-driven type brake system provided with such a brake fluid replenish passage, since the on-off valve in the replenish passage is opened when a large hydraulic pressure difference is produced between the master cylinder hydraulic pressure and the brake hydraulic pressure, water-hammering sound tends to be produced due to a sharp inflow of brake fluid through the replenish passage toward the wheel cylinder side, or vibration due to such water-hammering is transmitted to the brake pedal as the brake operating member through the master cylinder, thus worsening the pedal feeling.

An object of this invention is to provide a method of controlling a hydraulic pressure source-driven type vehicle hydraulic brake system in which water hammering or worsening of the pedal feeling will not happen when brake liquid is replenished through the replenish passage.

SUMMARY OF THE INVENTION

According to this invention, there is provided a method of controlling a vehicle hydraulic brake system comprising a brake operating member, a master cylinder for producing hydraulic pressure corresponding to a brake operating force applied to the brake operating member, a wheel cylinder, a hydraulic pressure source for producing brake hydraulic pressure in the wheel cylinder, a driving device for the hydraulic pressure source, a fluid passage for bringing the hydraulic pressure source into communication with the wheel cylinder, a fluid replenish passage for bringing the master cylinder and the wheel cylinder into communication with each other, an on-off valve and a check valve provided in the fluid replenish passage, the check valve preventing a reverse flow from the wheel cylinder toward the master cylinder, a brake operating force detecting means for detecting the brake operating force, a brake hydraulic pressure detecting means for detecting the brake hydraulic pressure in the wheel cylinder, and a master cylinder hydraulic pressure detecting means for detecting the hydraulic pressure in the master cylinder, the driving device for the hydraulic pressure source and the on-off valve in the fluid replenish passage being actuated based on signals from the brake operating force detecting means, the brake hydraulic pressure detecting means and the master cylinder hydraulic pressure detecting means, wherein when the brake operating force detecting means detects a predetermined brake operating force, the on-off valve in the fluid replenish passage is opened and the driving device for the hydraulic pressure source is actuated at full driving force, and upon detection of the fact that the difference between the master cylinder hydraulic pressure and the brake hydraulic pressure, which are detected by the master cylinder hydraulic pressure detecting means and the brake hydraulic pressure detecting means, respectively, has entered a predetermined range, the on-off valve in the fluid replenish passage is closed and the driving device for the hydraulic pressure source is actuated at a driving force corresponding to the difference between the master cylinder hydraulic pressure and the brake hydraulic pressure.

By actuating the driving device for the hydraulic pressure source at its full driving force with the on-off valve in the brake liquid replenish passage opened in an initial stage of brake operation in which the difference between the master cylinder hydraulic pressure and the brake hydraulic pressure is small but the brake operating force has reached a predetermined value, the occurrence of water hammering due to a sharp inflow of brake liquid to the wheel cylinder side from the replenish passage is prevented.

Also, when the brake hydraulic pressure has increased and the hydraulic pressure difference from the master cylinder hydraulic pressure has entered a predetermined range, the on-off valve in the replenish passage is closed to return to normal control mode in which the driving force of the driving device for the hydraulic pressure source is controlled so as to correspond to the difference between the master cylinder hydraulic pressure and the brake hydraulic pressure.

This control method of a vehicle hydraulic brake system can be applied to a brake system in which a master cylinder passage for bringing the master cylinder and the wheel cylinder into communication with each other through an on-off valve is provided, and the on-off valve in the master cylinder passage is selectively opened and closed to transmit the hydraulic pressure produced in the master cylinder to the wheel cylinder.

Other features and objects of the present invention will become apparent from the following description made with reference to the accompanying drawings, in which:

DETAILED DESCRIPTION OF THE PREFERRED EMBODIMENT

Figure 1:
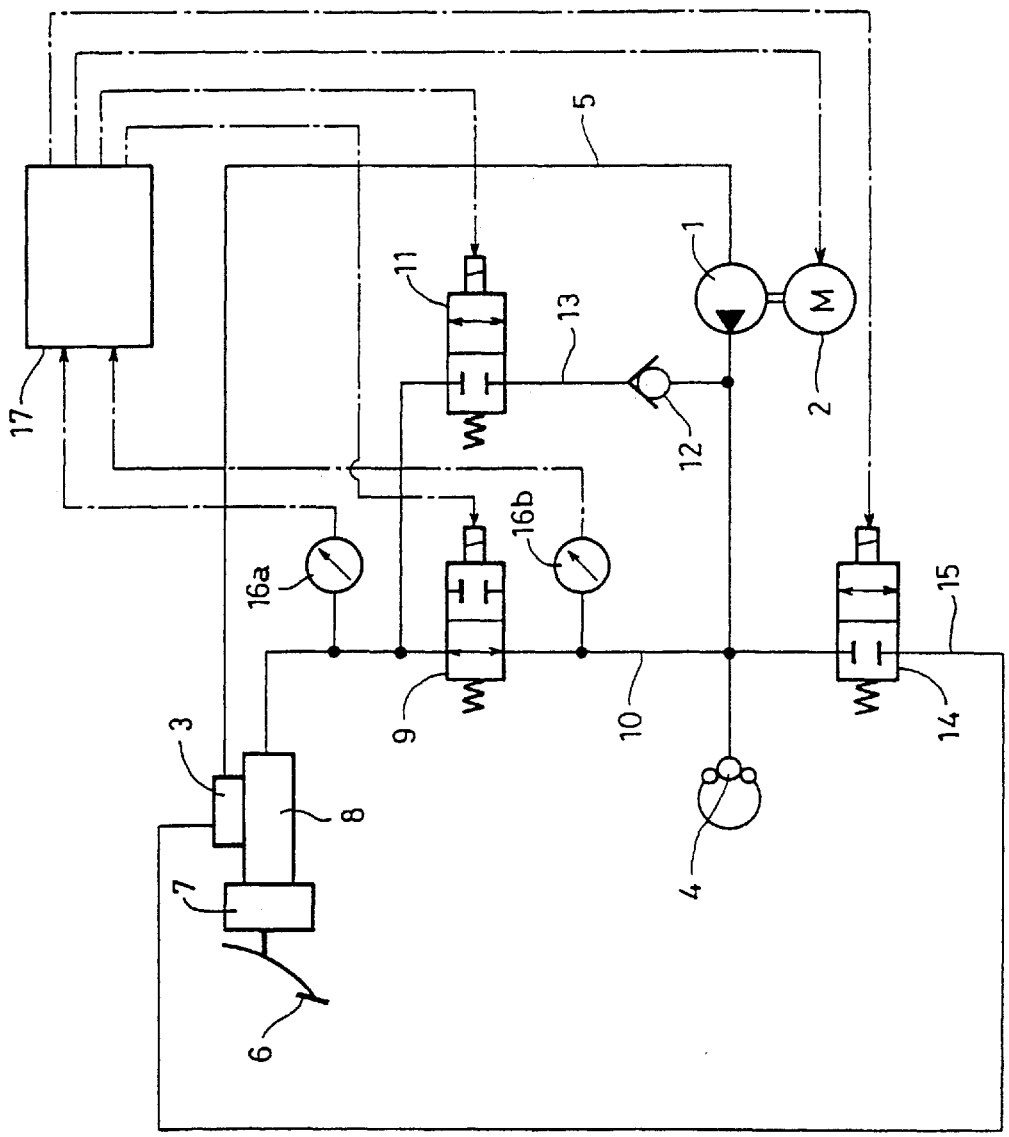
FIG. 1 is a circuit diagram showing a brake system to which the control method of the present invention is applied.

Hereinbelow, with reference to the drawings, the embodiments of this invention is described. FIG. 1 shows a vehicle hydraulic brake system to which is applied the control method of the present invention. This brake system has a pump 1 as a hydraulic pressure source, and a motor 2 as its driving device. The pump 1 is mounted in a fluid passage 5 bringing a reservoir tank 3 and a wheel cylinder 4 into communication with each other. A brake pedal 6 as a brake operating member is coupled to a master cylinder 8 through a booster 7. The master cylinder 8 and the wheel cylinder 4 are brought into communication with each other by a master cylinder passage 10 through a solenoid valve 9, which is an on-off valve. They also communicate with each other through a brake fluid replenish passage 13 in which a solenoid valve 11 and a check valve 12 are mounted in series and which is provided parallel to the master cylinder passage 10.

The check valve 12 serves to prevent the brake fluid from flowing from the wheel cylinder 4 toward the master cylinder 8. Between the wheel cylinder 4 and the reservoir tank 3, there is also provided a brake fluid relief passage 15 in which a solenoid valve 14 is mounted.

In the master cylinder passage 10, pressure sensors 16a, 16b for detecting the hydraulic pressure in the master cylinder 8 and the brake hydraulic pressure in the wheel cylinder 4, respectively, are mounted. The pressure sensor 16a is also used for the detection of pedal depressing force, that is, a brake operating force. The detection signals from the pressure sensors 16a, 16b are put into a controller 17, which based on these detection signals, controls the operation of the motor 2 and solenoid valves 9, 11 and 14.

Next, the control method of the brake system by the controller 17 will be described. In a normal state, the controller 17 shuts off the master cylinder passage 10 by closing the solenoid valve 9, and actuates the motor 2 and the solenoid valve 11 in the below-described control method, thereby producing brake fluid pressure in the wheel cylinder 4. But if the amount of brake fluid supplied to the wheel cylinder 4 is insufficient for some reason and the controller 17 judges that the brake hydraulic pressure detected by the pressure sensor 16b is insufficient, it will open the solenoid valve 9 in the master cylinder passage 10 to transmit the hydraulic pressure in the master cylinder 8 to the wheel cylinder 4 to produce a sufficient brake hydraulic pressure.

In either case, the controller 17 detects the depressing of the brake pedal 6 and closes the solenoid valve 14 in the relief passage 15. When it detects the release of the brake pedal 6, it releases the braking force by opening the solenoid valve 14, and returns brake fluid supplied to the wheel cylinder 4 to the reservoir tank 3.

The control method during depressing of the brake pedal 6 in the normal state is described with reference to the Example.

EXAMPLE

Figure 2:
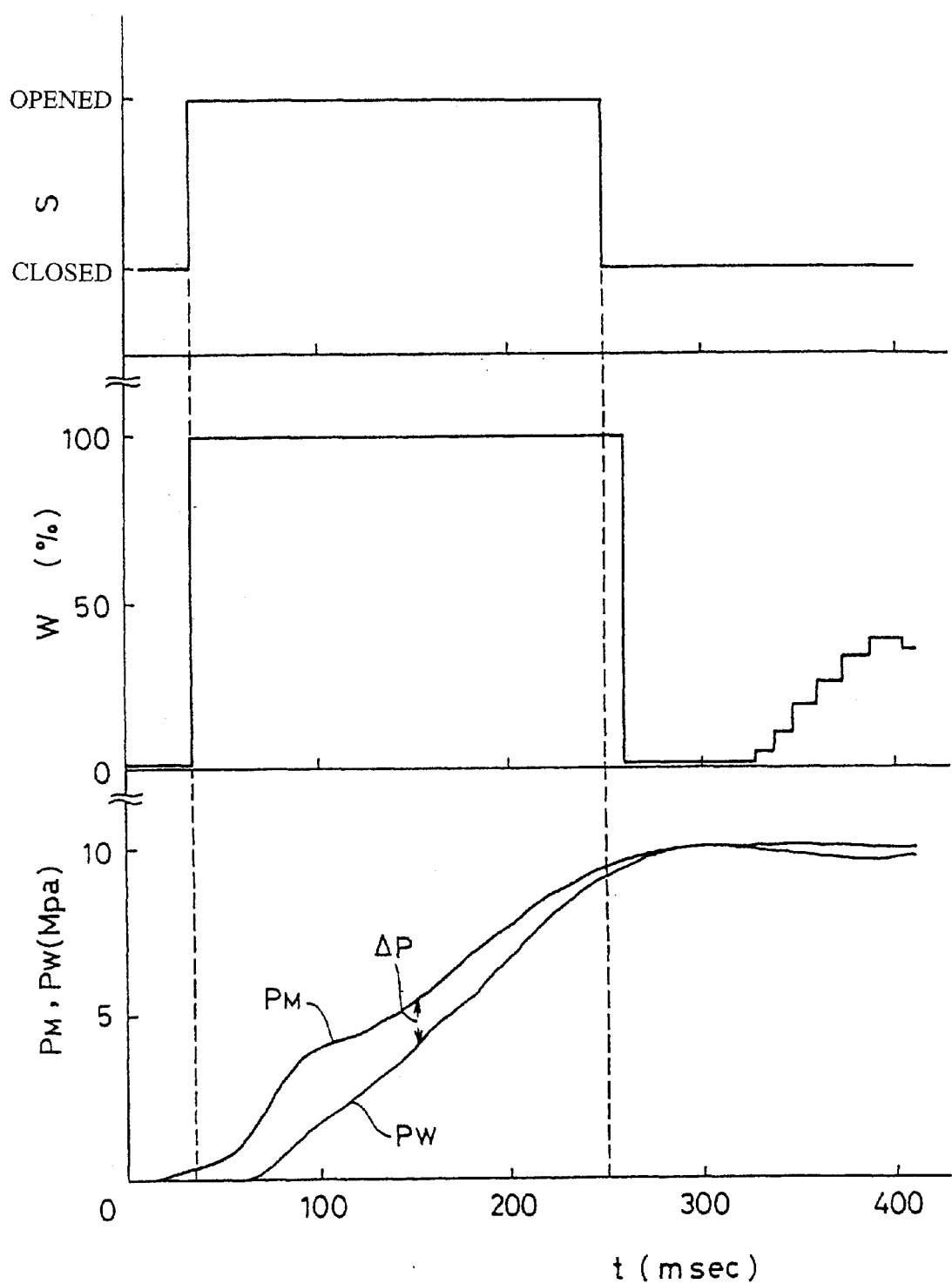
FIG. 2 is a graph showing control results in Example.

The graph of FIG. 2 shows, with the time t from the start of depressing of the brake pedal 6 as abscissa, changes in the master cylinder hydraulic pressure PM detected by the pressure sensor 16a, and the brake hydraulic pressure PW in the wheel cylinder 4 detected by the pressure sensor 16b, which are input signals of control, and the motor driving force W, which is an output signal of control, and an on-off signal S to the solenoid valve 11 in the replenish passage 13, arranged in parallel.

When the brake pedal 6 begins to be depressed, and the master cylinder hydraulic pressure PM, which also serves to detect the brake operating force, reaches a predetermined value (0.5 MPa), the controller 17 will open the solenoid valve 11 in the replenish passage 13, activates the motor 2, and sets its driving force at 100% to replenish brake fluid from the master cylinder 8 to the wheel cylinder 4. The brake hydraulic pressure PW will quickly increase so as to follow the rise of the master cylinder hydraulic pressure PM.

Thereafter, when the brake hydraulic pressure PW increases and the hydraulic pressure difference ΔP from the master cylinder hydraulic pressure PM enters a predetermined range (±0.2 MPa), the controller 17 will close the solenoid valve 11 and almost simultaneously change the command of motor driving force W to a control in which the hydraulic pressure difference ΔP is used as an input signal to control the motor driving force W by PID control.

COMPARATIVE EXAMPLE

Figure 3:
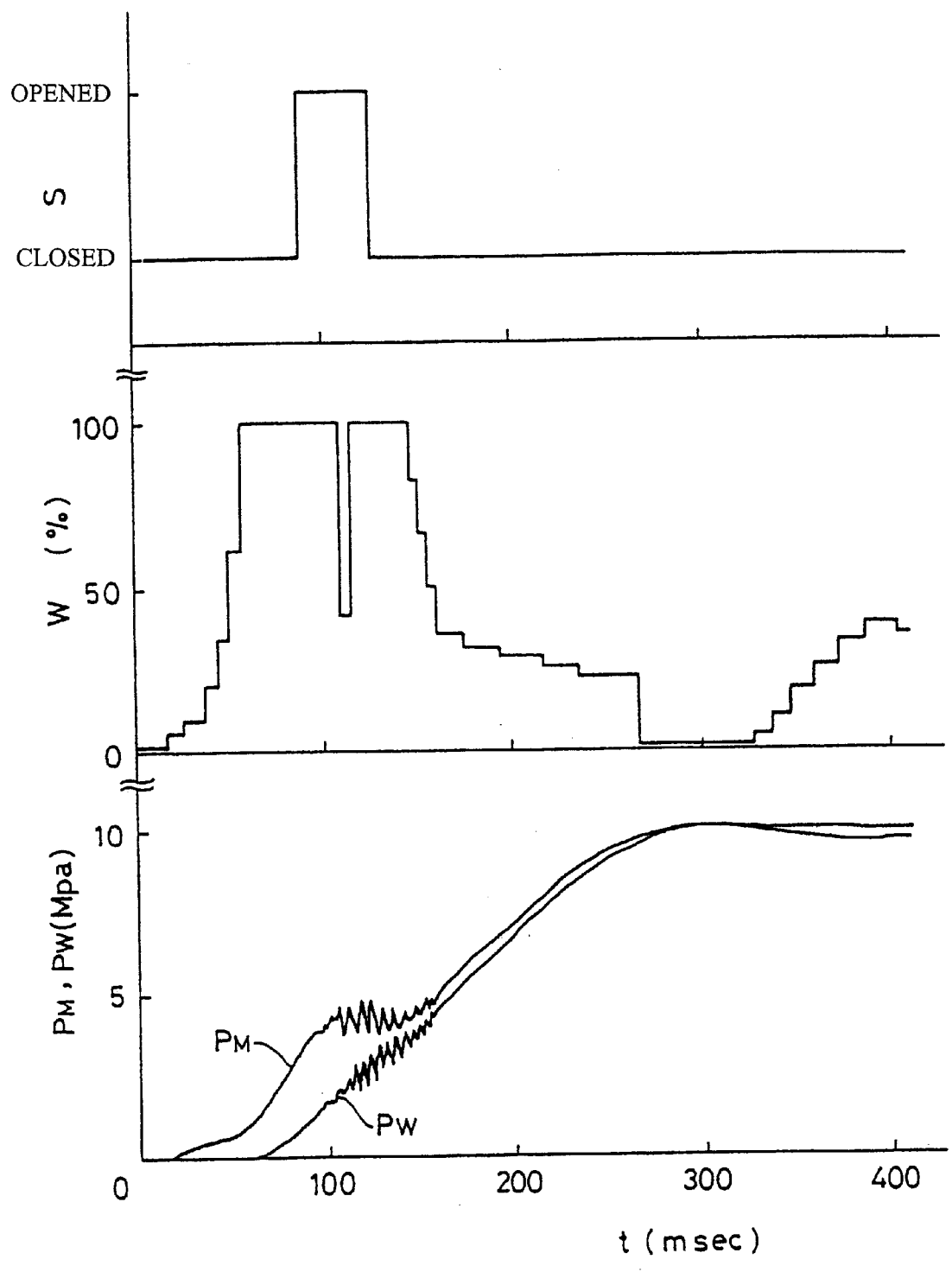
FIG. 3 is a graph showing control results in Comparative Example.

Using the same brake system as shown in FIG. 1, as in a conventional control, the solenoid valve 11 in the replenish passage 13 was opened to replenish brake fluid from the master cylinder 8 when the pressure difference ΔP between the master cylinder hydraulic pressure PM and the brake hydraulic pressure PW exceeded the predetermined value. Its control results are shown in the graph of FIG. 3. The way the graph is drawn is the same as in FIG. 2.

In this control, when the master cylinder hydraulic pressure PM, which also serves to detect the brake operating force, rises, the motor 2 for driving the pump 1 is activated, and the motor driving force W is increased by PID control so as to correspond to an increase in the master cylinder hydraulic pressure PM. At this time, since there is some response delay in the pressure rise of the brake hydraulic pressure PW by the pump 1, the hydraulic pressure difference ΔP between the master cylinder hydraulic pressure PM and the brake hydraulic pressure PW is rather large.

Only after the hydraulic pressure difference ΔP has exceeded a predetermined value (about 2 MPa), the solenoid valve 11 in the replenish passage 13 is opened for the first time, and brake fluid is replenished from the master cylinder 8. At this time, water hammering occurs due to a sharp inflow of brake fluid toward the wheel cylinder 4 resulting from the opening of the solenoid valve 11 under a large hydraulic pressure difference ΔP, so that due to vibration of such water hammering, pulsation is produced in the master cylinder hydraulic pressure PM. Due to such pulsation, the hydraulic pressure difference ΔP from the brake hydraulic pressure PW also fluctuates, and such a fluctuation makes the control of the motor driving force w temporarily unstable.

As will be apparent from comparison of the control results of Example and Comparative Example, according to the control method of the present invention, it is possible to quickly and smoothly increase the brake hydraulic pressure PW following the master cylinder hydraulic pressure PM without causing water hammering due to a sharp inflow of brake fluid.

In the above-described embodiment, when the master cylinder hydraulic pressure PM, which also serves to detect the brake operating force, reaches the predetermined value, opening of the solenoid valve in the replenish passage, actuation of the motor and setting of the motor driving force W to 100% are carried out simultaneously. But the motor may be actuated beforehand. Also, a separate sensor for detecting the brake operating force may be provided to carry out a similar control based on the output of such a sensor.

As described above, in the control method of vehicle hydraulic brake system of this invention, the on-off valve in the brake liquid replenish passage is opened and the driving device for the hydraulic pressure source is actuated at a full driving force in the initial stage of brake operation in which the difference between the master cylinder pressure and the brake hydraulic pressure is small and the brake operating force reaches a predetermined value.

Also, in the stage in which the brake hydraulic pressure is increased until the hydraulic pressure difference from the master cylinder hydraulic pressure has entered a predetermined range, the on-off valve in the replenish passage is closed to return to the normal control in which the driving force of the driving device for the hydraulic pressure source is controlled so as to correspond to the hydraulic pressure difference between the master cylinder pressure and the brake hydraulic pressure.

Thus, when brake liquid is replenished from the replenish passage, it is possible to quickly and smoothly increase the brake hydraulic pressure following the master cylinder hydraulic pressure without causing water hammering due to a sharp inflow of brake liquid toward the wheel cylinder side or worsening of the feeling of brake operation.

What is claimed is:

1. A method of controlling a vehicle hydraulic brake system comprising a brake operating member, a master cylinder for producing hydraulic pressure corresponding to a brake operating force applied to said brake operating member, a wheel cylinder, a hydraulic pressure source for producing brake hydraulic pressure in said wheel cylinder, a driving device for said hydraulic pressure source, a fluid passage for bringing said hydraulic pressure source into communication with said wheel cylinder, a fluid replenish passage for bringing said master cylinder and said wheel cylinder into communication with each other, an on-off valve and a check valve provided in said fluid replenish passage, said check valve preventing a reverse flow from said wheel cylinder toward said master cylinder, a brake operating force detecting means for detecting said brake operating force, a brake hydraulic pressure detecting means for detecting the brake hydraulic pressure in said wheel cylinder, and a master cylinder hydraulic pressure detecting means for detecting the hydraulic pressure in said master cylinder, said driving device for said hydraulic pressure source and said on-off valve in said fluid replenish passage being actuated based on signals from said brake operating force detecting means, said brake hydraulic pressure detecting means and said master cylinder hydraulic pressure detecting means, wherein when said brake operating force detecting means detects a predetermined brake operating force, said on-off valve in said fluid replenish passage is opened and said driving device for said hydraulic pressure source is actuated at full driving force, and upon detection of the fact that the difference between the master cylinder hydraulic pressure and the brake hydraulic pressure, which are detected by said master cylinder hydraulic pressure detecting means and said brake hydraulic pressure detecting means, respectively, has entered a predetermined range, said on-off valve in said fluid replenish passage is closed and said driving device for said hydraulic pressure source is actuated at a driving force corresponding to the difference between the master cylinder hydraulic pressure and the brake hydraulic pressure.

2. A method of controlling a vehicle hydraulic brake system as claimed in claim 1 wherein a master cylinder passage for bringing said master cylinder and said wheel cylinder into communication with each other through an on-off valve is provided, and said on-off valve in said master cylinder passage is selectively opened and closed to transmit the hydraulic pressure produced in said master cylinder to said wheel cylinder.

* * * * *